(12) United States Patent
Sato

(10) Patent No.: US 11,055,586 B2
(45) Date of Patent: Jul. 6, 2021

(54) PRINTING DEVICE THAT RECEIVES PRINT DATA AND PERFORMS PRINTING, CONTROL METHOD OF PRINTING DEVICE, AND PROGRAM

(71) Applicant: CANON KABUSHIKI KAISHA, Tokyo (JP)

(72) Inventor: Haruki Sato, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/567,217

(22) Filed: Sep. 11, 2019

(65) Prior Publication Data
US 2020/0104657 A1    Apr. 2, 2020

(30) Foreign Application Priority Data

Sep. 27, 2018   (JP) .............................. JP2018-182743

(51) Int. Cl.
*G06F 3/12* (2006.01)
*G06K 15/02* (2006.01)
*H04N 1/00* (2006.01)

(52) U.S. Cl.
CPC ....... *G06K 15/1806* (2013.01); *G06F 3/1237* (2013.01); *H04N 1/00233* (2013.01)

(58) Field of Classification Search
CPC ............. H04N 1/0097; H04N 1/00244; H04N 1/00344; H04N 1/4433; H04N 1/00933; H04N 2201/0094
See application file for complete search history.

(56) References Cited

U.S. PATENT DOCUMENTS

| 6,075,615 A | * | 6/2000 | Nakamura | ............ G06F 3/1203 |
| | | | | 358/1.14 |
| 2003/0072021 A1 | * | 4/2003 | Stingham | ................ G06F 40/58 |
| | | | | 358/1.13 |
| 2016/0011830 A1 | * | 1/2016 | Asakura | ................ G06F 3/1292 |
| | | | | 358/1.15 |

FOREIGN PATENT DOCUMENTS

JP    H09-258931 A    10/1997

* cited by examiner

*Primary Examiner* — Huo Long Chen
(74) *Attorney, Agent, or Firm* — Venable LLP

(57) ABSTRACT

A printing device determines whether a character string indicating argument corresponding to a first command has been registered as a registered virtual printer name, when an optional command of received print data includes the first command indicating a predetermined type of optional command and the character string indicating argument corresponding to the first command, generates a print job that prints the file data by using print settings associated with the registered virtual printer if the character string indicating argument corresponding to the first command has been registered as the virtual printer name, and generates a print job that analyzes the character string indicating argument corresponding to the first command and prints the file data by using the print settings specified based on the analyzed result if the character string indicating argument corresponding to the first command has not been registered as the virtual printer name.

4 Claims, 9 Drawing Sheets

FIG. 7

ADDITION OF VIRTUAL PRINTER — 700

[ ADD ] 703    [ CANCEL ] 704

701 — VIRTUAL PRINTER NAME: [ 12345 ]

702 — ITEMS TO BE SET IN VIRTUAL PRINTER

| ITEM NAME | CHANGE OF SETTING VALUES |
|---|---|
| FEEDING UNIT | FEEDING CASSETTE 1 ▼ |
| PAPER TYPE | AUTO ▼ |
| DISCHARGED TO | TRAY 2 ▼ |
| COPIES | 30   (1~9999) |
| 2-SIDED PRINTING | YES (LONG EDGE BINDING) ▼ |
| COLOR MODE | FULL COLOR ▼ |
| STAPLE | YES ▼ |
| POSITION | UPPER LEFT ▼ |

| CHARACTER STRING | CORRESPONDING PRINT SETTINGS |
|---|---|
| A3 | PRINT ON A3 PAPER |
| B4 | PRINT ON B4 PAPER |
| A4 | PRINT ON A4 PAPER |
| B5 | PRINT ON B5 PAPER |
| SIMP | 1-SIDED PRINTING |
| DUPL | 2-SIDED, LONG EDGE BINDING |
| DUPS | 2-SIDED, SHORT EDGE BINDING |
| CXX | PRINT XX COPIES (XX: NUMBER) |

PRINTING DEVICE THAT RECEIVES PRINT DATA AND PERFORMS PRINTING, CONTROL METHOD OF PRINTING DEVICE, AND PROGRAM

BACKGROUND OF THE INVENTION

Field of the Invention

The present invention relates to a printing device, a control method of a printing device, and a program, and more particularly relates to a printing device that receives a print request from a terminal device connected via a network and performs print output.

Description of the Related Art

Conventionally, an image forming apparatus that manages a print queue (hereinafter, referred to as a "virtual printer") has been known. When such an image forming apparatus receives a print job from a terminal device connected via a network, it determines from a printer name specified in the print job whether or not a printer that performs the print processing is a virtual printer. Subsequently, if printing by the virtual printer has been specified, print settings associated in advance with the specified virtual printer are added to the print job, and then the print job is transmitted to the virtual printer (Japanese Unexamined Patent Application, First Publication No. H09-258931).

As a protocol for transmitting the print job to the image forming apparatus, RFC 1179 of LPR (Line Printer Daemon) protocol is known. If a virtual printer is specified in the LPR protocol, it is necessary to include the name of the virtual printer as a print queue name in a job reception request command, as described above.

In contrast, as an image forming apparatus conforming to the LPR protocol, there is an image forming apparatus that determines print settings based on a character string included in a print queue name of the job reception request command. For example, if a job reception request command including the character string "A4" in the print queue name is received, such an image forming apparatus has a function of performing print processing by using an A4 sheet. Additionally, it is possible to specify a plurality of types of print settings, and in specifying the print settings at the same time, the character strings may be connected by using "_", for example, "DUAL_A4".

SUMMARY OF THE INVENTION

The present invention provides an image forming apparatus that can appropriately determine whether print settings are specified by a virtual printer name or are specified by a character string included in a print queue name of a job reception request command, and then perform print processing.

In order to solve the above problems, a printing device according to an embodiment of the present invention comprises a memory storing instructions; and a processor executing the instructions causing the printing device to: register a virtual printer name in association with print settings used during print processing by the virtual printer based on a user's operation; receive print data including an optional command for printing and file data to be printed from an external device via a network; perform determination processing to determine whether or not a command argument of the option command included in the received print data has been registered as the registered virtual printer name; generate a print job that prints the file data by using the print settings associated with the registered virtual printer if it has been determined in the determination processing that the command argument has been registered as the virtual printer name; generate a print job that analyzes the command argument and prints the file data by using the print settings specified based on the analyzed result if it has been determined in the determination processing that the command argument has not been registered as the virtual printer name; and print an image on a sheet based on the generated print job.

According to the present invention, it is possible to provide an image forming apparatus that can appropriately determine whether to use print settings associated with a virtual printer name or to use print settings specified by a character string included in a print queue name of a job reception request command, and then perform print processing.

Further features of the present invention will become apparent from the following description of exemplary embodiments with reference to the attached drawings.

BRIEF DESCRIPTION OF THE DRAWINGS

FIG. 7 illustrates a virtual printer addition screen in each embodiment.

DESCRIPTION OF THE EMBODIMENTS

As described above, in the case of using an LPR protocol, a print queue name specified for a print job is used for two purposes. One purpose is to specify a virtual printer name and the other purpose is to represent a simple specification of print settings. Accordingly, in the job reception of the LPR protocol, both the virtual printer name and a character string indicating the print settings are specified as a print queue name of a job request command of the LPR protocol.

According to one aspect of the present invention, a mechanism is provided in which an image forming apparatus can support both a function of specifying print settings by using a virtual printer name as the print queue name and a function of specifying print settings by including a character string in the print queue name.

For example, if the image forming apparatus receives a job reception request command in which the character string "Printer_A4" is specified in the print queue name in a state in which the image forming apparatus manages the virtual printer named "Printer_A4", it performs control so as to execute the print processing with the print settings associated with the virtual printer. For example, if the image forming apparatus receives a job reception request command in which the character string "Printer_A4" is specified in the print queue name in a state in which the image forming apparatus does not manage the virtual printer, it performs control so as to execute the print processing by handling the character string "A4" as print settings.

Additionally, according to one aspect of the present invention, if the print queue name matches the virtual printer managed by the image forming apparatus, the image forming apparatus performs control so as to execute the print processing with the print settings associated with the matched virtual printer, and if the print queue name does not match the virtual printer, the image forming apparatus performs control so as to execute the print processing by handling a character string included in the print queue name as print settings.

Embodiments of the present invention will be described below with reference to the drawings. Here, an MFP (Multi Function Peripheral) having a scanning function and a printing function is exemplified as an example of the image forming apparatus. However, the present invention is not limited thereto. For example, the present invention is applicable to a single function printing apparatus.

First Embodiment

Figure 1:
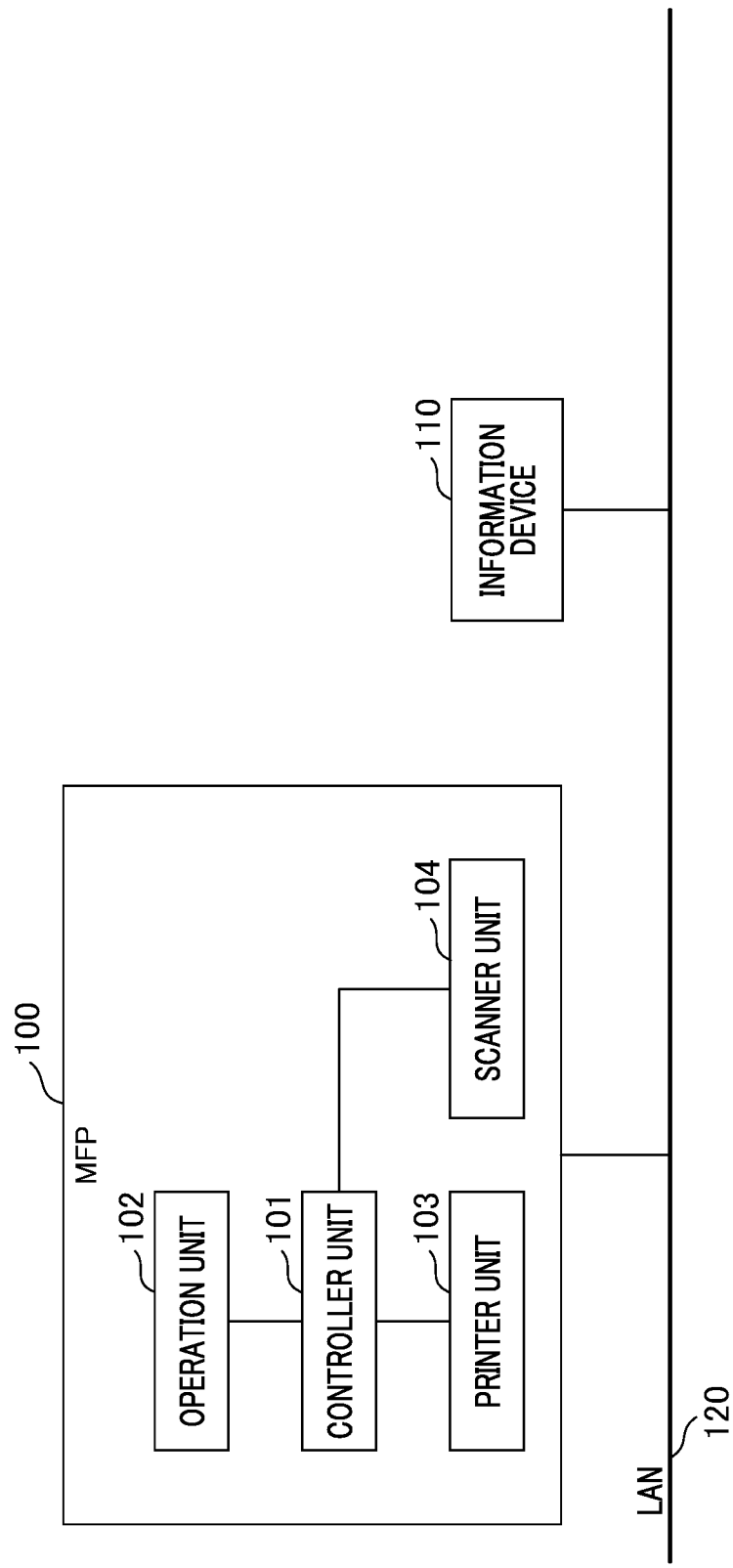
FIG. 1 is a block diagram illustrating a connection configuration between an MFP and an information apparatus in each embodiment.

FIG. 1 is a block diagram illustrating a connection configuration between the MFP (image forming apparatus) and an information device according to the present embodiment.

An MFP 100 and an information device (terminal device) 110 are connected via a LAN (Local Area Network) 120.

The MFP 100 includes a controller unit 101 that performs the entire control of the MFP 100, an operation unit 102 that performs input/output with a user, a printer unit 103 that prints and outputs electronic data on a paper medium, and a scanner unit 104 that reads the paper medium and converts it into electronic data.

The operation unit 102, the printer unit 103, and the scanner unit 104 are connected to the controller unit 101, and realize a function as a multi-function device under the control of the controller unit 101.

The information device 110 transmits a print job to the MFP 100 in accordance with the LPR protocol (print request). For example, the print job in accordance with the LPR protocol can be transmitted to the MFP 100 by inputting and executing the following command on a command line of the information device 110 by the user.

lpr-S<IP address>-P<Print Queue Name><File name to print>

Figures 8, 9:
FIG. 8 illustrates character strings interpreted as print settings by the MFP and corresponding print settings in each embodiment.
FIG. 9 illustrates a job reception request command of an LPR protocol in each embodiment.

In the LPR protocol, a print job is configured by a job reception request command (equivalent to an optional command of the present invention, see FIG. 9), a control file, and print data.

The control file is configured by information such as a user name, a host name, and a print job name, which are stored based on the specifications of the LPR protocol.

Additionally, the print data is written in a page description language supported by the MFP 100.

Figure 2:
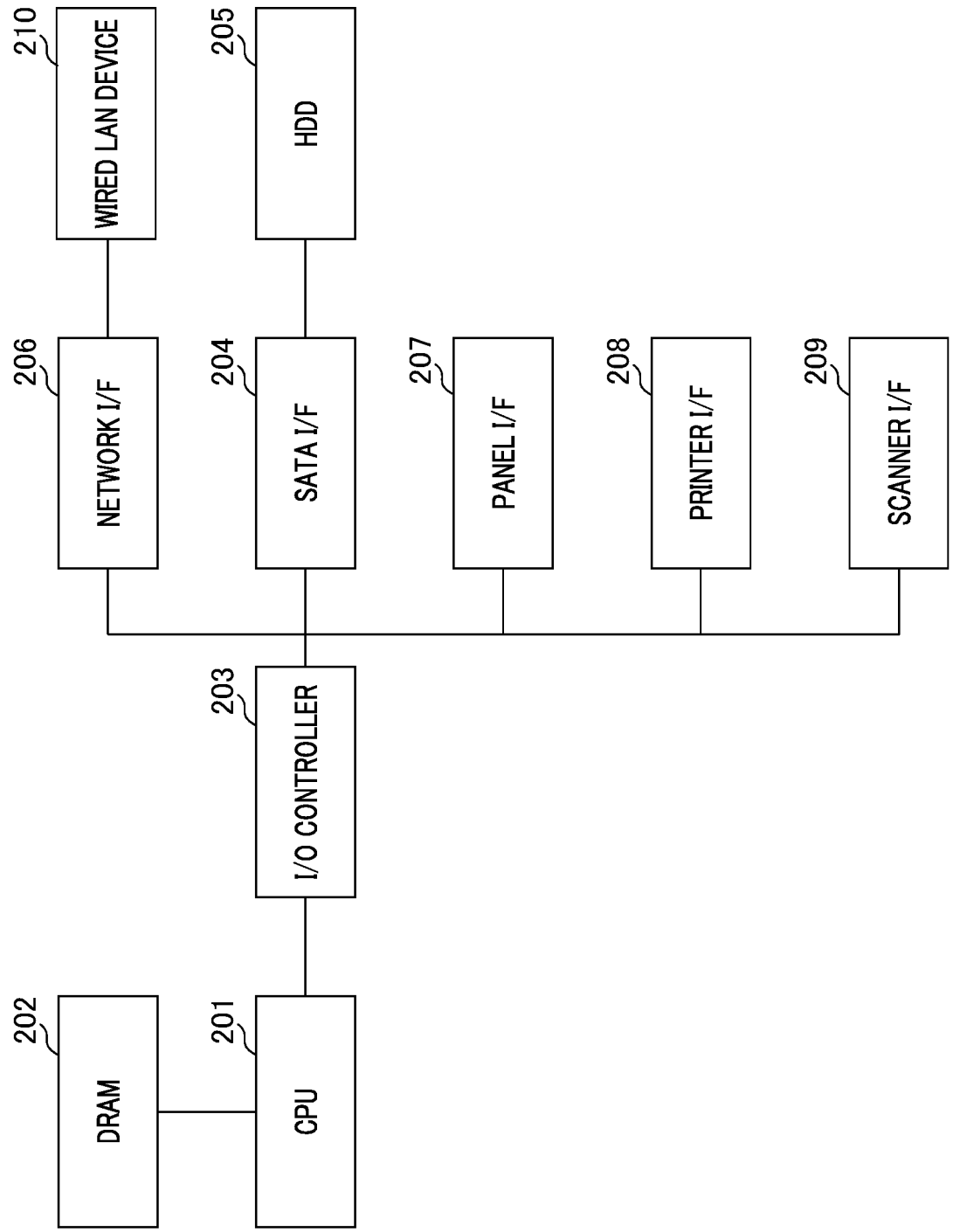
FIG. 2 is an internal configuration diagram of a controller unit of the MFP in each embodiment.

FIG. 2 is a block diagram illustrating details of the controller unit 101 of the MFP.

A CPU 201 performs the main calculation processing in the controller. The CPU 201 is connected to a DRAM 202 via a bus.

The DRAM 202 is used as a working memory for temporarily storing program data that represents a calculation instruction and data to be processed, which are generated in the process of calculation performed by the CPU 201.

An I/O controller 203 is connected to the CPU 201 via a bus, and performs input/output to/from various devices in accordance with an instruction from the CPU 201.

A HDD 205 is connected to the I/O controller 203 via a SATA (Serial Advanced Technology Attachment) I/F 204. The CPU 201 uses the HDD 205 for permanently storing a program for realizing the function of the MFP and the document data that has been read.

A wired LAN device 210 is connected to the I/O controller 203 via a network I/F 206. The CPU 201 realizes communication on the LAN 120 by controlling the wired LAN device 210 via the network I/F 206. A panel I/F 207 is connected to the I/O controller 203. The CPU 201 realizes user's input/output to/from the operation unit 102 via the panel I/F 207.

A printer I/F 208 is connected to the I/O controller 203. The CPU 201 realizes output processing to a paper medium that uses the printer unit 103 via the printer I/F 208.

A scanner I/F 209 is connected to the I/O controller 203. The CPU 201 realizes reading processing of an original by using the scanner unit 104 via the scanner I/F 209.

Figure 3:
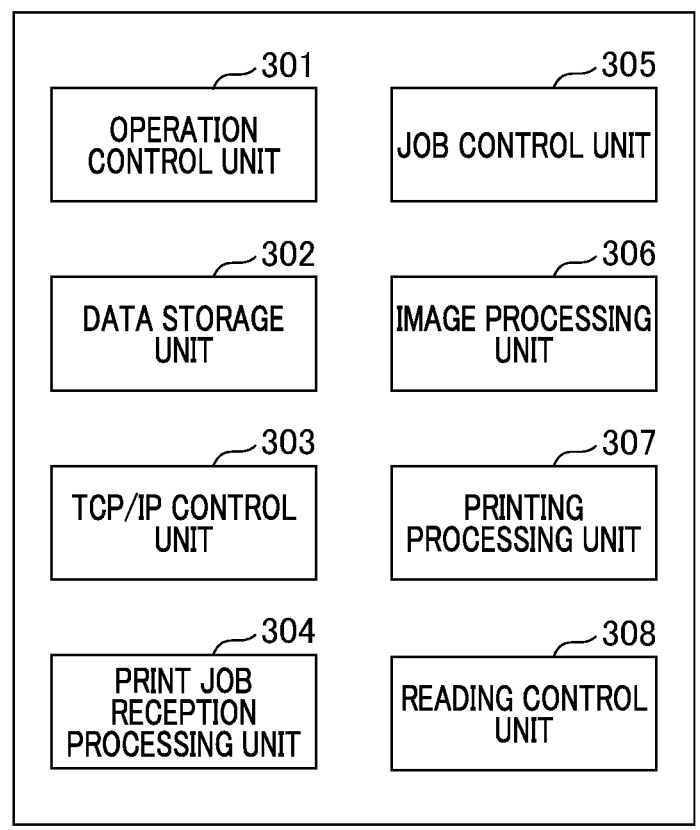
FIG. 3 is a block diagram of software executed in the controller of the MFP in each embodiment.

FIG. 3 is a block diagram illustrating a structure of software executed by the controller unit 101 of the MFP.

All of the software executed by the controller unit 101 is realized by the CPU 201 reading the programs stored in the HDD 205 into the DRAM 202 and then executing them.

Note that in the MFP of the present embodiment, although one CPU 201 executes each process shown in a flowchart to be described below by using one memory (DRAM 202), another condition may be used. For example, a plurality of processors and a plurality of memories and storages may cooperate to execute each process shown in a flowchart to be described below. Additionally, a hardware circuit may be used to perform a part of the processes.

An operation control unit 301 executes processing that displays a screen image for a user on the operation unit 102, and performs processing associated with screen components such as buttons displayed on the screen, for example, detection of a user operation.

A data storage unit (storage means) 302 stores the data in the HDD 205 or reads out the data from the HDD 205 in response to a request from another control unit. For example, if the user wants to change some device settings, the operation control unit 301 detects changes that have been input by the user to the operation unit 102, and the data storage unit 302 stores the changes in the HDD 205 based on a request from the operation control unit 301.

A TCP/IP control unit 303 transmits and receives a network packet via the network I/F 206 in accordance with an instruction from another control unit. If receiving a packet conforming to the LPR protocol, the TCP/IP control unit 303 passes the packet to a print job reception processing unit 304 to provide an instruction of the print job reception processing. The print job reception processing unit (print request means) 304 handles the LPR packet passed from the TCP/IP control unit 303 as print job data. The print job reception processing unit 304 reads out the specified print queue name from the job reception request command included in the print job data. Subsequently, the print job reception processing unit 304 specifies print settings corresponding to this print queue name. The specified print settings are added to the print job and then the print job is transmitted to a job control unit 305, thereby instructing (requesting) execution of the print job.

The job control unit (print processing means) 305 controls job execution, such as print processing, in accordance with instructions from another control unit.

An image processing unit 306 processes the image data into a format that is suitable for the purpose of the image data in accordance with an instruction from the job control unit 305.

A print processing unit 307 transmits a print job via the printer I/F 208 in accordance with an instruction from the job control unit 305, thereby causing the printer unit 103 to print on a paper medium.

A reading control unit 308 transmits a reading job via the scanner I/F 209 in accordance with an instruction from the job control unit 305, thereby causing the scanner unit 104 to read the original that has been set.

For example, if the print job that has been transmitted in accordance with the LPR protocol from the information device 110 is executed, first, the TCP/IP control unit 303 detects reception of the LPR packet and instructs the print job reception processing unit 304 to perform print job reception processing. Subsequently, the print job reception processing unit 304 instructs the job control unit 305 to execute the print job. Then, the job control unit 305 instructs the print processing unit 307 to perform printing and outputs the print result.

Figure 4:
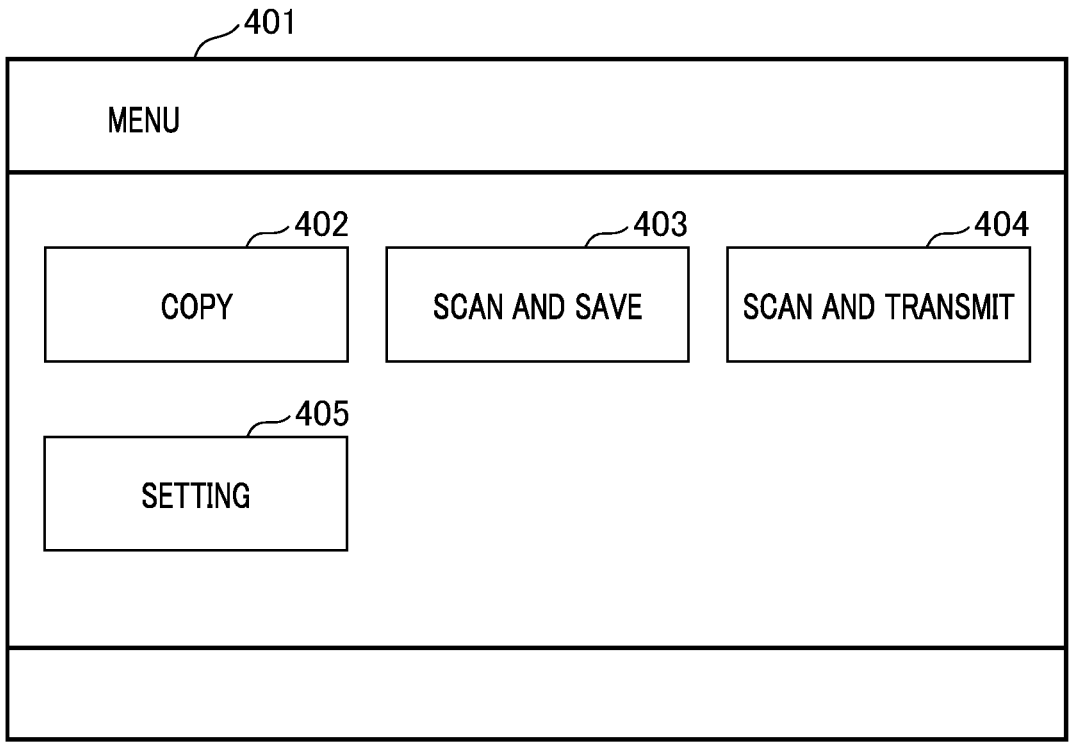
FIG. 4 illustrates a menu screen displayed on an operation unit in each embodiment.

FIG. 4 illustrates a menu screen 401 displayed on the operation unit 102.

The menu screen 401 is a screen for the user to provide an instruction for the execution of various functions of the multifunction peripheral.

A button 402 is used by the user to instruct the copy function.

A button 403 is used by the user to instruct the functions for scanning and saving.

Additionally, a button 404 is used by the user to instruct the functions for scanning and transmission.

A button 405 is used by the user to instruct the change of the setting of the apparatus. By pressing the button 405, a setting screen 501 can be displayed.

Figure 5:
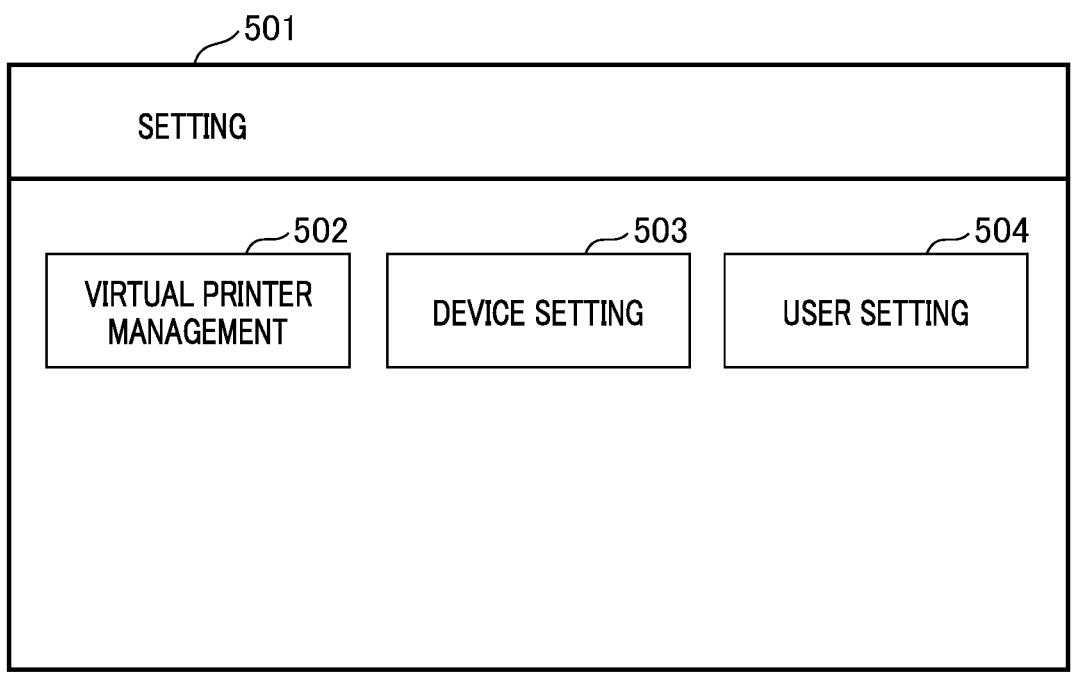
FIG. 5 illustrates a setting screen displayed on the operation unit in each embodiment.

FIG. 5 illustrates the setting screen 501 displayed on the operation unit 102.

The setting screen 501 is for the user to provide instructions for various settings. This screen itself is an intermediate state screen that does not display specific setting items, but serves as a guide to detailed setting items.

By pressing a button 502, a virtual printer management setting screen 600 can be displayed.

By pressing a button 503, a device setting screen (not illustrated) can be displayed.

By pressing a button 504, a user setting screen (not illustrated) can be displayed.

Figure 6:
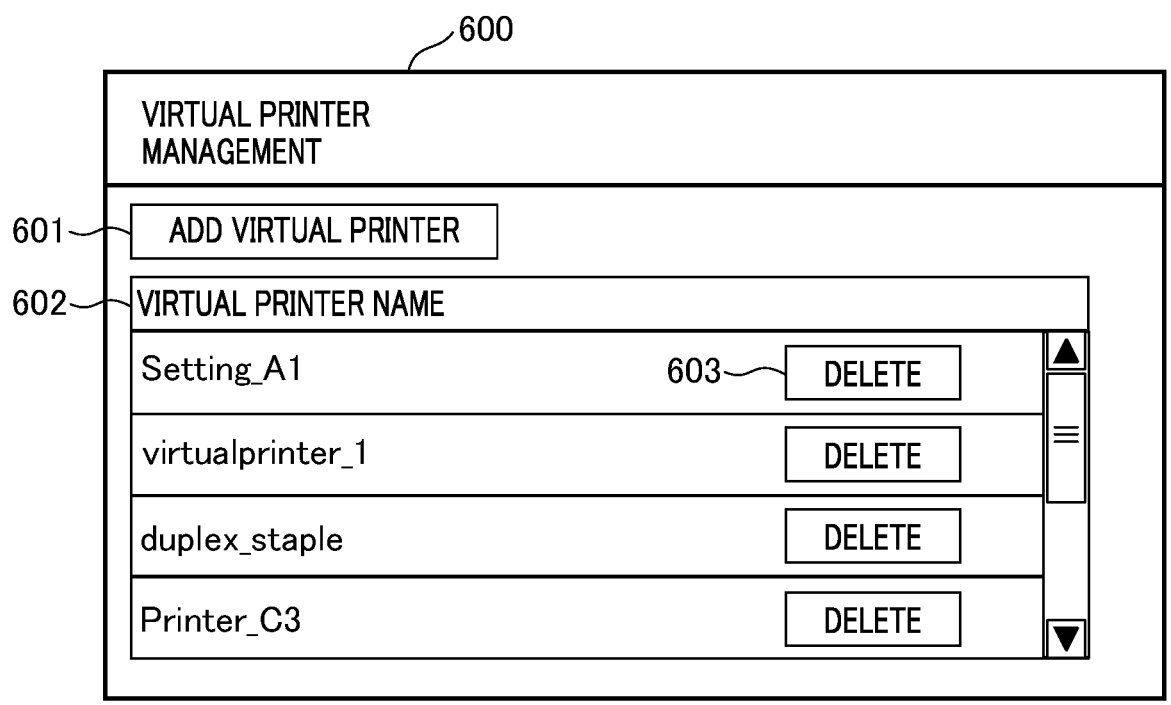
FIG. 6 illustrates a virtual printer management setting screen displayed on the operation unit in each embodiment.

FIG. 6 illustrates the virtual printer management setting screen 600 displayed on the operation unit 102.

By pressing a button 601, a virtual printer addition screen 700 can be displayed.

A list of the virtual printers set in the MFP 100 is displayed in the region 602. A delete button 603 is displayed in each display field of the virtual printers.

By pressing the delete button 603, the virtual printer settings can be deleted from the MFP 100.

FIG. 7 illustrates the virtual printer addition screen 700.

The virtual printer addition screen 700 is used to add virtual printer settings to the MFP 100.

A user can input an arbitrary virtual printer name to a virtual printer name input unit 701.

A print setting specifying unit 702 allows the user to specify the print settings in association with the virtual printer. In the example shown in FIG. 7, the settings are specified in which 30 copies of an output object are printed with double-sided printing (long edge binding), full color, stapled at the upper left by using papers stored in the paper feed cassette 1 and are discharged to the paper discharge tray 2.

In this state, upon the pressing of a button 703, the virtual printer name input to the virtual printer name input unit 701 and the print settings specified by the print setting specifying unit 702 are associated with each other and stored in the data storage unit 302 as the virtual printer settings (print queue information).

The virtual printer name corresponding to the newly registered print settings is added to the display of the virtual printer management setting screen 600. In contrast, by pressing a button 704, it is possible to return to the virtual printer management setting screen 600 without storing the virtual printer settings in the data storage unit 302.

FIG. 8 illustrates a relation between a character string that is interpreted by the MFP 100 as print settings if the character string is included in the print queue name of the job reception request command of the LPR protocol and the corresponding print settings.

In the present embodiment, if any one of character strings 800 shown in the left column of FIG. 8 is included in the print queue name, the character string is interpreted as information for specifying the print settings shown in the right column of FIG. 8. For example, print settings "Print on A3 Paper" corresponds to a print queue name including the character string "A3".

FIG. 9 illustrates a job reception request command stored at the head of the print job data conforming to the LPR protocol. In the job reception request command in FIG. 9, 0x02 is stored as a command code 901, subsequently a print queue name 902 is stored, and a line feed code (0x0a) 903 is stored at the end. The print queue name 902 equivalents to "the command argument" of the present invention.

In print jobs in which the virtual printer has been specified and a print job in which the print settings have been specified, a virtual printer name or a character string indicating print settings is stored in the print queue name 902. FIG. 9 illustrates an example in which the character string, "Printer_C3", is stored in the print queue name 902.

The "Printer_C3" stored in the print queue name 902 matches the "Printer_C3" in the virtual printer name 602 that is set in the MFP 100 shown in FIG. 6. In addition, "C3" of "Printer_C3" matches "CXX", which is the character string interpreted by the MFP 100, as the print settings shown in FIG. 8. Thus, in the example of FIG. 9, the print queue name 902 is compatible with both the virtual printer name and the character string indicating the print setting. Therefore, the MFP 100 needs to determine whether the "Printer_C3" stored in the print queue name 902 is to be handled as a virtual printer name or is to be handled as a character string indicating the print settings.

Figure 10:
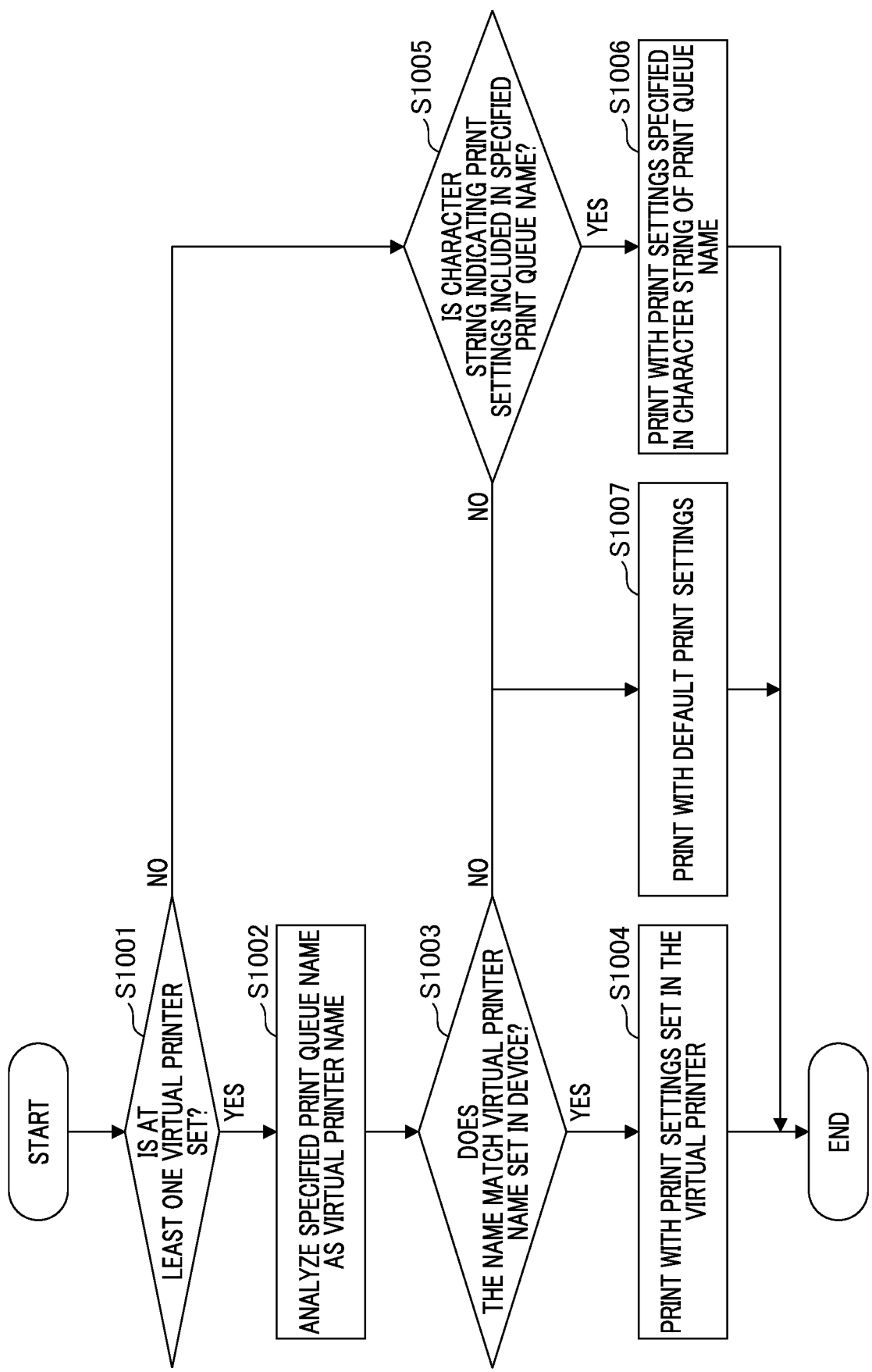
FIG. 10 is a flowchart illustrating a process on the MFP side according to the first embodiment.

Next, a process upon receipt of a print job conforming to the LPR protocol by the MFP 100 from the information device 110 connected via the LAN 120 will be described with reference to the flowchart of FIG. 10. The process performed by the MFP 100 shown in FIG. 10 is executed as calculation processing of the CPU 201 after the CPU 201 reads the program stored in the HDD 205 into the DRAM 202.

Upon receipt of the LPR packet (that is, print job data) from the TCP/IP control unit 303, the print job reception processing unit 304 starts the print job reception processing.

First, in step S1001, the print job reception processing unit 304 acquires virtual printer information (print queue information) set in the MFP 100 from the data storage unit 302. Subsequently, the print job reception processing unit 304 determines whether or not at least one virtual printer has been set. If a virtual printer has been set (YES), the print job reception processing unit 304 executes step S1002, and if not (NO), the print job reception processing unit 304 executes step S1005.

Next, in step S1002, the print job reception processing unit 304 acquires the print queue name 902 from the job reception request command included in the print job data, and interprets the print queue name 902 to serve as a virtual printer name to which the print job is to be assigned.

Next, in step S1003, the print job reception processing unit 304 compares each virtual printer name set in the MFP 1003 with the print queue name 902 that has been acquired from the job reception request command, and determines whether or not there is a matched one.

If a matched virtual printer name is found (YES), step S1004 is performed. If a matched virtual printer name is not found (NO), step S1007 is performed.

In step S1004, the print job reception processing unit 304 acquires the print settings associated with the virtual printer name that has been found in step S1003, associates the print settings with the print data included in the print job data, and causes the job control unit 305 to execute the print job. Accordingly, the MFP 100 can output a printed material based on the print settings of the virtual printer specified by the job reception request command of the LPR.

In step S1005, the print job reception processing unit 304 determines from the print job data whether or not a character string indicating the print settings shown in FIG. 8 is included in the print queue name 902 stored in the job reception request command. If the character string is included (YES), step S1006 is executed. If the character string is not included (NO), step S1007 is executed.

Next, in step S1006, the print job reception processing unit 304 associates the print settings corresponding to the character string included in the print queue name 902 with the print data included in the print job data, and causes the job control unit 305 to execute the print job. Accordingly, the MFP 100 can output the print data with the print settings specified by the job reception request command of the LPR.

On the other hand, in step S1007, the print job reception processing unit 304 instructs the job control unit 305 to execute the print job using the print data included in the print job data. As a result, the MFP 100 performs the print processing with the initial settings (default). For example, if the initial settings of the MFP 100 are "A4 Paper" and "single-sided printing", single-sided printing is executed on A4 paper.

As described above, according to the present embodiment, it is possible to provide an image forming apparatus that can perform print processing by appropriately selecting print settings from print settings associated with a virtual printer name and print settings specified by a character string included in the print queue name of the job reception request command. Thus, the user can determine whether the print settings are to be specified by selecting a virtual printer or are to be specified by transmitting a job reception request command in which the print settings are stored in the print queue name 902, depending on whether or not the virtual printer is to be registered in the MFP 100. Therefore, during registration of the virtual printer name, the user does not need to be aware of whether or not the registered name includes a character string indicating the print settings.

Second Embodiment

Hereinafter, the second embodiment will be described below with reference to the drawings. Note that since FIGS. 1 to 9 have the same configuration as that of the first second embodiment, a detailed description thereof will be omitted.

In the first embodiment, first, it is determined whether or not the virtual printer is set in the MFP 100 (step S1001), and subsequently, the print queue name 902 stored in the job reception request command is extracted from the print job data, and the character string included in this print queue name 902 is determined (step S1003 and step S1005). In contrast, in the present embodiment, the character string included in the print queue name 902 is determined without determining whether or not the virtual printer has been set.

Figure 11:
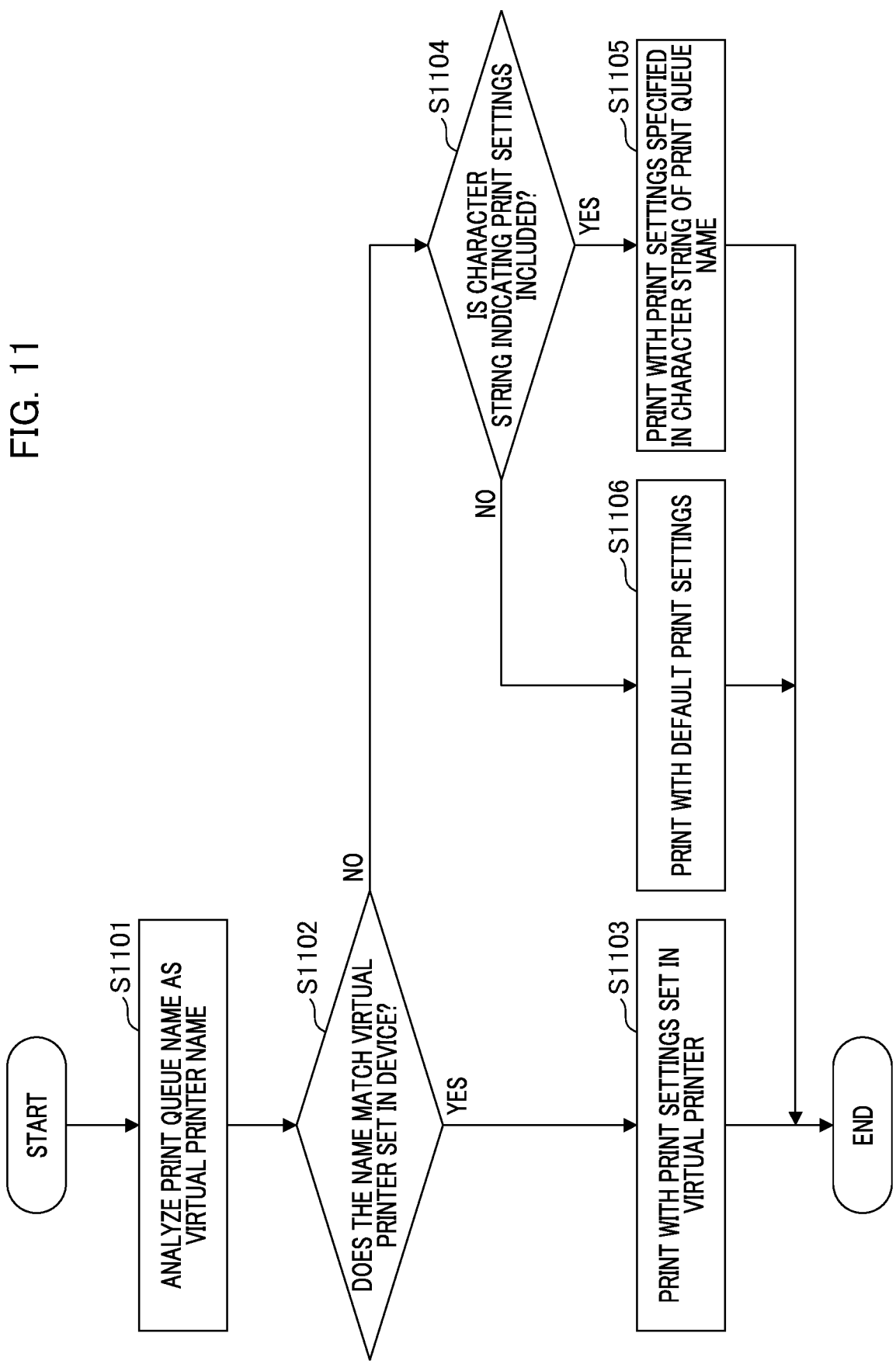
FIG. 11 is a flowchart illustrating a process on the MFP side according to the second embodiment.

In the present embodiment, a process upon receipt of a print job conforming to the LPR protocol by the MFP 100 from the information device 110 connected via the LAN 120 will be described with reference to the flowchart of FIG. 11. The process performed by the MFP 100 shown in FIG. 11 is performed as calculation processing by the CPU 201 after the CPU 201 reads the program stored in the HDD 205 into the DRAM 202.

Upon receipt of the LPR packet (that is, print job data) from the TCP/IP control unit 303, the print job reception processing unit 304 starts the print job reception processing.

In step S1101, the print job reception processing unit 304 acquires the print queue name 902 stored in the job reception request command from the print job data. The print job reception processing unit 304 uses the acquired print queue 902 to serve as the name of the virtual printer to which the print job is to be assigned, and performs interpretation processing.

Next, in step S1102, the print job reception processing unit 304 compares each virtual printer name set in the MFP 100 with the print queue name 902 acquired from the job reception request command, and determines whether or not a matched virtual printer name exists.

If the matched virtual printer name is found (YES), the print job reception processing unit 304 performs step S1103. If the matched virtual printer name is not found (NO), the print job reception processing unit 304 performs step S1104.

Next, in step S1103, the print job reception processing unit 304 acquires the print settings associated with the virtual printer name that has been found in step S1102, associates the print settings with the print data included in the print job data, and causes the job control unit 305 to execute the print job. Thus, the MFP 100 can output a printed material based on the print settings of the virtual printer specified by the job reception request command of the LPR.

In step S1104, the print job reception processing unit 304 determines from the print job data whether or not a character string instructing the print settings shown in FIG. 8 is included in the print queue name 902 stored in the job reception request command. If the character string is included (YES), step S1105 is executed. If the character string is not included (NO), step S1106 is executed.

Next, in step S1105, the print job reception processing unit 304 associates the print settings corresponding to the character string included in the print queue name 902 with the print data included in the print job data, and causes the job control unit 305 to execute the print job. Consequently, the MFP 100 can output the print data with the print settings specified by the job reception request command of the LPR.

Next, in step S1106, the print job reception processing unit 304 instructs the job control unit 305 to execute the print job using the print data included in the print job data. Accordingly, the MFP 100 performs print processing with the initial settings.

Therefore, in the present embodiment, both a user who wants to transmit a print job to the MFP 100 by specifying a virtual printer in a print queue name and a user who wants to specify the print settings in a print job to be transmitted to the MFP 100 can use the MFP 100 without changing the settings.

As described above, according to the present embodiment, it is possible to provide an image forming apparatus that can perform print processing by appropriately selecting the print settings from the print settings associated with the virtual printer name or the print settings specified by the character string included in the print queue name of the job reception request command. Thus, the MFP 100 can appropriately determine whether to use the print settings associated with the virtual printer name specified by the job reception request command or to use the print settings determined from the character string included in the print queue name of the job reception request command.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-182743, filed Sep. 27, 2018, which is hereby incorporated by reference herein in its entirety.

What is claimed is:

1. A printing device comprising:
a memory storing instructions; and
a processor executing the instructions causing the printing device to:
register a virtual printer name in association with print settings used during print processing by the virtual printer based on a user's operation;
receive print data including an optional command for printing and file data to be printed from an external device via a network;
determine whether or not one or more of the virtual printer names have been registered;
determine whether or not a character string indicating argument corresponding to a first command has been registered as the registered virtual printer name, by checking whether or not the registered virtual printer names include a name that matches the character string indicating argument corresponding to the first command, in a situation that the optional command of the received print data includes the first command indicating a predetermined type of optional command and the character string indicating argument corresponding to the first command and it is determined that one or more of the virtual printer names have been registered;
generate a print job that prints the file data by using the print settings associated with the registered virtual printer in a situation that it is determined that the character string indicating argument corresponding to the first command has been registered as the virtual printer name;
generate a print job that analyzes the character string indicating argument corresponding to the first command and prints the file data by using the print settings specified based on the analyzed result in a situation that it is determined that the one or more virtual printer names have not been registered;
generate a print job that prints the file data by using predetermined print settings in a situation that it is determined that one or more of the virtual printer names has been registered, and the character string indicating argument corresponding to the first command does not match any one of the registered virtual printer names; and
print an image on a sheet based on the generated print job.

2. The printing device according to claim 1,
wherein in the checking, comparing the registered virtual printer name with the character string indicating argument corresponding to the first command to determine whether or not they match each other.

3. A control method for a printing device, the method comprising:
registering a virtual printer name in association with print settings used during print processing by the virtual printer based on a user's operation;
receiving print data including an optional command for printing and file data to be printed from an external device via a network;
determining whether or not one or more of the virtual printer names have been registered;
determining whether or not a character string indicating argument corresponding to a first command has been registered as the registered virtual printer name, by checking whether or not the registered virtual printer names include a name that matches the character string indicating argument corresponding to the first command, in a situation that the optional command of the received print data includes the first command indicating a predetermined type of optional command and the character string indicating argument corresponding to the first command and it is determined that one or more of the virtual printer names have been registered;

generating a print job that prints the file data by using the print settings associated with the registered virtual printer in a situation that it is determined that the character string, indicating argument corresponding to the first command has been registered as the virtual printer name;

generating a print job that analyzes the character string indicating argument corresponding to the first command and prints the file data by using the print settings specified based on the analyzed result in a situation that it is determined that the one or more virtual printer names have not been registered;

generating a print job that prints the file data by using predetermined print settings in a situation that it is determined that one or more of the virtual printer names has been registered, and the character string indicating argument corresponding to the first command does not match any one of the registered virtual printer names; and printing an image on a sheet based on the generated print job.

4. A non-transitory computer-readable storage medium on which is stored a computer program for making a computer execute a method for controlling a printing device, the method comprising:

registering the name of the virtual printer in association with print settings used based on the operation of the user if the virtual printer performs a print process;

registering a virtual printer name in association with print settings used during print processing by the virtual printer based on a user's operation;

receiving print data including an optional command for printing and file data to be printed from an external device via a network;

determining whether or not one or more of the virtual printer names have been registered;

determining whether or not a character string indicating argument corresponding to a first command has been registered as the registered virtual printer name, by checking whether or not the registered virtual printer names include a name that matches the character string indicating argument corresponding to the first command, in a situation that the optional command of the received print data includes the first command indicating a predetermined type of optional command and the character string indicating argument corresponding to the first command and it is determined that one or more of the virtual printer names have been registered;

generating a print job that prints the file data by using the print settings associated with the registered virtual printer in a situation that it is determined that the character string indicating argument corresponding to the first command has been registered as the virtual printer name;

generating a print job that analyzes the character string indicating argument corresponding to the first command, and prints the file data by using the print settings specified based on the analyzed result in a situation that it is determined that the one or more virtual printer names have not been registered;

generating a print job that prints the file data by using predetermined print settings in a situation that it is determined that one or more of the virtual printer names has, been registered, and the character string indicating argument corresponding to the first command does not match any one of the registered virtual printer names; and printing an image on a sheet based on the generated print job.

* * * * *